Jan. 8, 1924.
G. O. WILMS
1,480,326
CONTROLLING APPARATUS FOR BATTERY CHARGING MOTOR GENERATOR
SETS AND METHOD OF STARTING OPERATION OF THE SAME
Filed March 30, 1920
3 Sheets-Sheet 1

Inventor
Gustav O. Wilms
By Frank S. Ratcliff
Attorney.

Jan. 8, 1924. 1,480,326
G. O. WILMS
CONTROLLING APPARATUS FOR BATTERY CHARGING MOTOR GENERATOR
SETS AND METHOD OF STARTING OPERATION OF THE SAME
Filed March 30, 1920 3 Sheets-Sheet 2
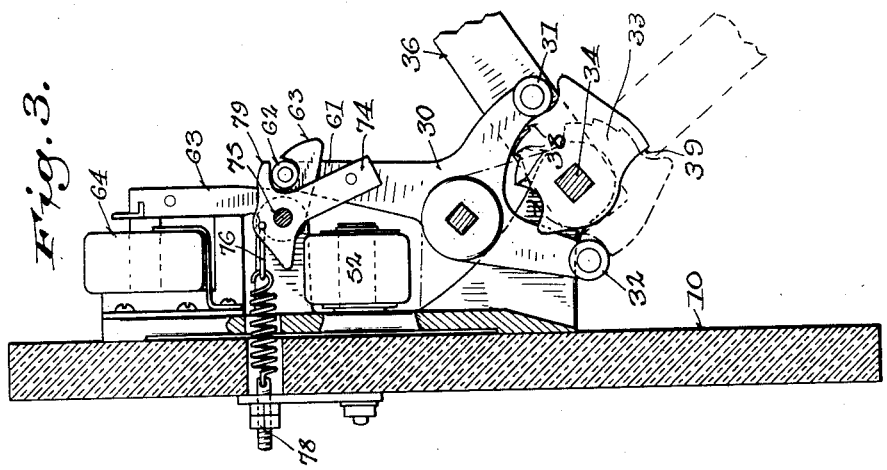
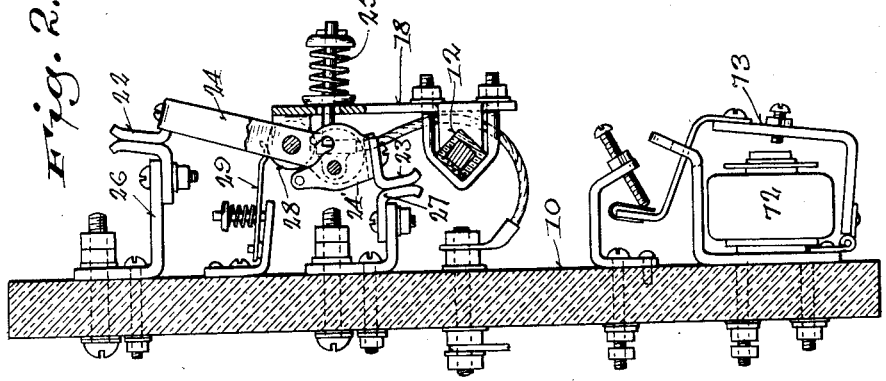
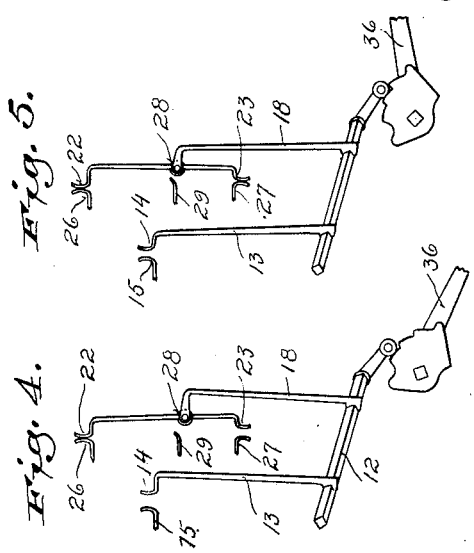
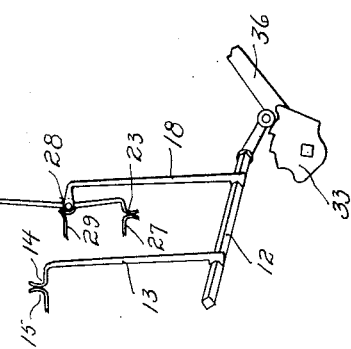
Inventor
Gustav O. Wilms
By Frank S. Ratcliff
Attorneys.

Jan. 8, 1924. 1,480,326
G. O. WILMS
CONTROLLING APPARATUS FOR BATTERY CHARGING MOTOR GENERATOR
SETS AND METHOD OF STARTING OPERATION OF THE SAME
Filed March 30, 1920 3 Sheets-Sheet 3

Inventor
Gustav O. Wilms
By Frank S. Ratcliffe
Attorney.

Patented Jan. 8, 1924.

1,480,326

UNITED STATES PATENT OFFICE.

GUSTAV O. WILMS, OF MILWAUKEE, WISCONSIN, ASSIGNOR TO THE RELIANCE COMPANY, OF MILWAUKEE, WISCONSIN, A CORPORATION OF WISCONSIN.

CONTROLLING APPARATUS FOR BATTERY-CHARGING MOTOR-GENERATOR SETS AND METHOD OF STARTING OPERATION OF THE SAME.

Application filed March 30, 1920. Serial No. 369,990.

*To all whom it may concern:*

Be it known that I, GUSTAV O. WILMS, a citizen of the United States, and resident of Milwaukee, in the county of Milwaukee and State of Wisconsin, have invented certain new and useful Improvements in Controlling Apparatus for Battery-Charging Motor-Generator Sets and Methods of Starting Operation of the Same; and I do hereby declare that the following is a full, clear, and exact description thereof.

My invention relates to new and useful improvements in means for controlling electric current and finds its present application in the provision of an improved method and apparatus for controlling the operation of a battery-charging motor-generator set, although various features of my invention are susceptible of use in other connections.

A primary object of my invention is to provide for the starting of a motor-generator set in a manner causing the least amount of overload disturbance in the circuit for supplying current to the motor and it is more particularly my object to provide for the utilization of the current of a storage battery in starting the operation of a motor-generator charging set for said battery whereby to prevent the occurrence of overload conditions in the motor supply circuit, particularly when the motor is of the usual alternating-current induction type, the present invention finding particular application in connection with storage battery units located in districts wherein the electric service equipment is not designed to withstand heavy overload of current.

A further and important object of my invention resides in the provision of an arrangement wherein the switch members of the alternating and direct current circuits of a motor-generator set may be embodied in a most simple and compact mechanism and may be operated by rocking movement of a single shaft.

A further object with respect to the switch mechanism resides in the provision of an arrangement for integrating the movement of an operating member for said mechanism into definite steps corresponding to the closure of successive circuits by the mechanism whereby the indication for a proper pause is effected at the completion of each step.

A still further object resides in the provision of an arrangement whereby a single magnetic tripping device may be effective to open a plurality of circuits upon undesired variation of current in either circuit.

A still further object resides in the provision of positive means operative to prevent completion of a series of motor-starting circuit-closing operations until current conditions are proper for such completion, and operative in the present instance to prevent a full line supply of current to the motor until a sufficient speed thereof has been attained to prevent an excessive draft of current upon closing the line circuit through the motor.

With the above and other objects and advantages in view, my invention resides more particularly in the novel combination, formation and arrangement of parts hereinafter described and pointed out in the appended claims.

In the accompanying drawings—

Figure 2 is a transverse sectional view on the line 2—2 of Fig. 1;

Figure 3 is a transverse sectional view on the line 3—3 of Fig. 1;

Figure 7:
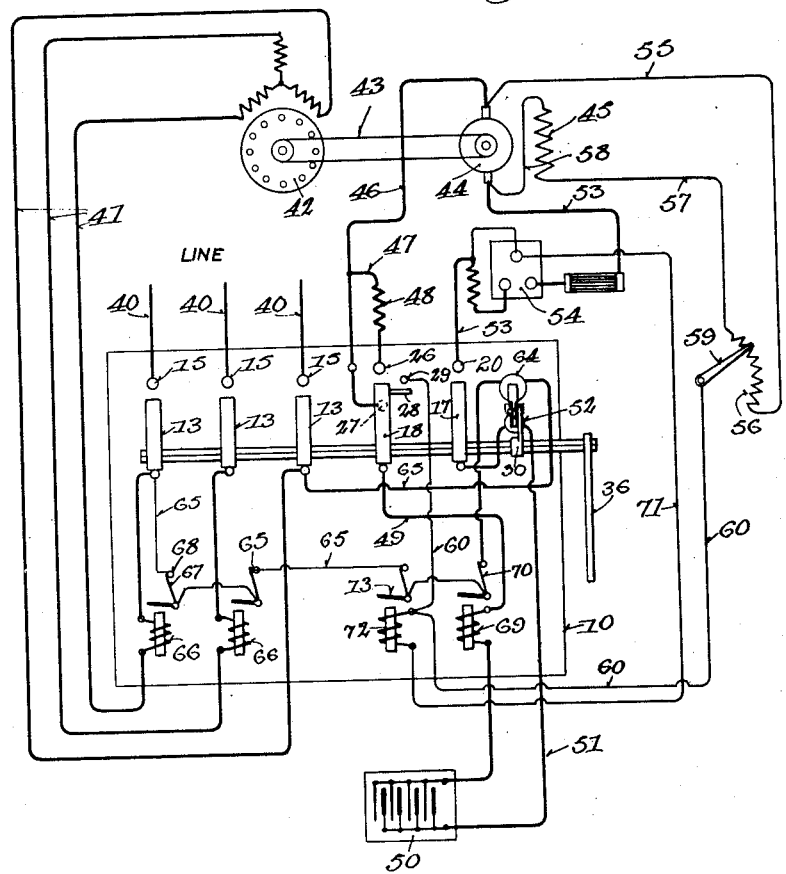

Figures 4, 5, and 6 illustrate in partly diagrammatic manner, the successive circuit-closing steps employed in my improved method of starting the operation of a battery-charging motor-generator set;

Figure 7 is a diagrammatic view of my improved apparatus and the circuits therefor.

Referring now more particularly to the accompanying drawings, 10 designates a wall panel on which the various switch members are mounted in the present embodiment of my invention. Bearing brackets 11 project from the end and intermediate portions of the panel and carry a square shaft 12 on which are mounted switch-arms for the main alternating and direct current circuits, there being, in the present instance, three switch-arms 13 for the three-phase alternating-current lines, each of these switch arms carrying a resiliently yieldable rocking portion 14 at its outer end engageable with a stationary contact 15 on the panel, the usual flexible conductors 16 being connected with each outer switch arm portion. The shaft 12 carries a pair of switch-arms 17 and 18 respectively, for the direct-current circuit. The arm 17 carries a resiliently yieldable outer end portion 19 engageable with a stationary contact 20 on the panel, said yieldable arm portion being connected with the usual flexible conductor 21. The direct-current switch-arm 18 carries a pair of inner and outer independently yieldable contact members 22 and 23 respectively, said members being mounted on levers 24 controlled by a spring 25 as in the co-pending application of Harry L. Bradley for patent for improvements in "multiple switch," filed June 6, 1919, Serial Number 302244, said contact members being successively engageable with stationary contacts 26 and 27 on the panel, upon rocking the shaft 12. A contact roller 28 is carried by the switch-arm 18, being preferably mounted on the pivot-shaft of the main contact bar 24, and this roller is engageable with a spring-urged contact arm 29 on the panel subsequent to engagement of the main contacts 22 and 23 of the switch-arm.

Rocking movement of the shaft 12, to procure engagement and disengagement of the various contacts recited, is effected by a crank-head 30 on one end of said shaft carrying pintles for a pair of rollers 31 and 32 disposed at the sides of a cam-plate 33 mounted on an operating shaft 34 journaled in bearing brackets 35 on the panel, this shaft being operated by a crank-handle 36, and being resiliently urged to a position in which said handle depends therefrom by a spring 37 coiled on and connected with the shaft and having one end bearing against one of the brackets 35. The cam-plate 33 is provided with a series of faces spaced successively greater distances from its axis, with consequent intervening shoulders 38 and said faces and shoulders are engageable with the outer roller 31 of the crank-head 30 to impart successive rocking movements to the shaft 12 to procure engagement of the various switch contacts, said cam-plate being also provided with a shoulder 39 engageable with the inner roller 32 of the crank-head to procure positive rocking movement of the shaft to disengage the contacts.

The various contacts carried by the shaft 12 are relatively so positioned that they will engage in the following order: First, the contacts 19 and 22 with the stationary contacts 20 and 26, then the contact 23 with the contact 27, then the alternating-current contacts 14 with their stationary contacts 15, followed very shortly by engagement of the contacts 28 and 29 to effect my novel circuit-controlling cycle for starting the operation of a battery-charging motor-generator set, and the shoulders 38 are relatively so disposed that engagement thereof by the crank-head roller of the shaft 12 will correspond to the circuit-closing steps so that resistance to shaft-turning movement caused by said shoulders will constitute signals to the operator, integrating the shaft-turning movement into definite steps whereby the operator may be apprised of the completion of each step and pause in the operation of rocking the shaft until the proper current conditions prevail for the succeeding step.

Referring now more particularly to the diagrammatic Fig. 7 disclosing the entire apparatus, it will be seen that the alternating-current service line wires 40 are connected with the corresponding plurality of contacts 15 of the panel and alternating-current lines 41 extend from the coacting switch-arms 13 to the field of an alternating-current motor 42 of the usual squirrel-cage type, this motor being connected by a conventionally shown drive-belt 43 with the armature 44 of a direct-current battery-charging generator having the usual shunt field 45. A line wire 46 extends from the armature 44 to the contact 27, and a wire 47 including a resistance unit 48 is connected with the line 46 and with the contact 26. A line 49 extends from the switch-arm 18 to the storage-battery 50. A line 51 extends back from the storage-battery through a lockout magnet 52, later to be described, to the switch-arm 17, and this line is continued at 53, passing through an ampere-hour meter 54 to the armature. A shunt-circuit wire 55 is extended from one side of the main direct-current circuit to one end of a rheostat resistance 56. A wire 57 extends from the other end of the rheostat resistance to the motor shunt field 45, and a wire 58 extends from the field 45 to the other side of the main line. A movable contact arm 59 of the rheostat 56 is connected by a line 60 with the contact 29.

Figure 1:
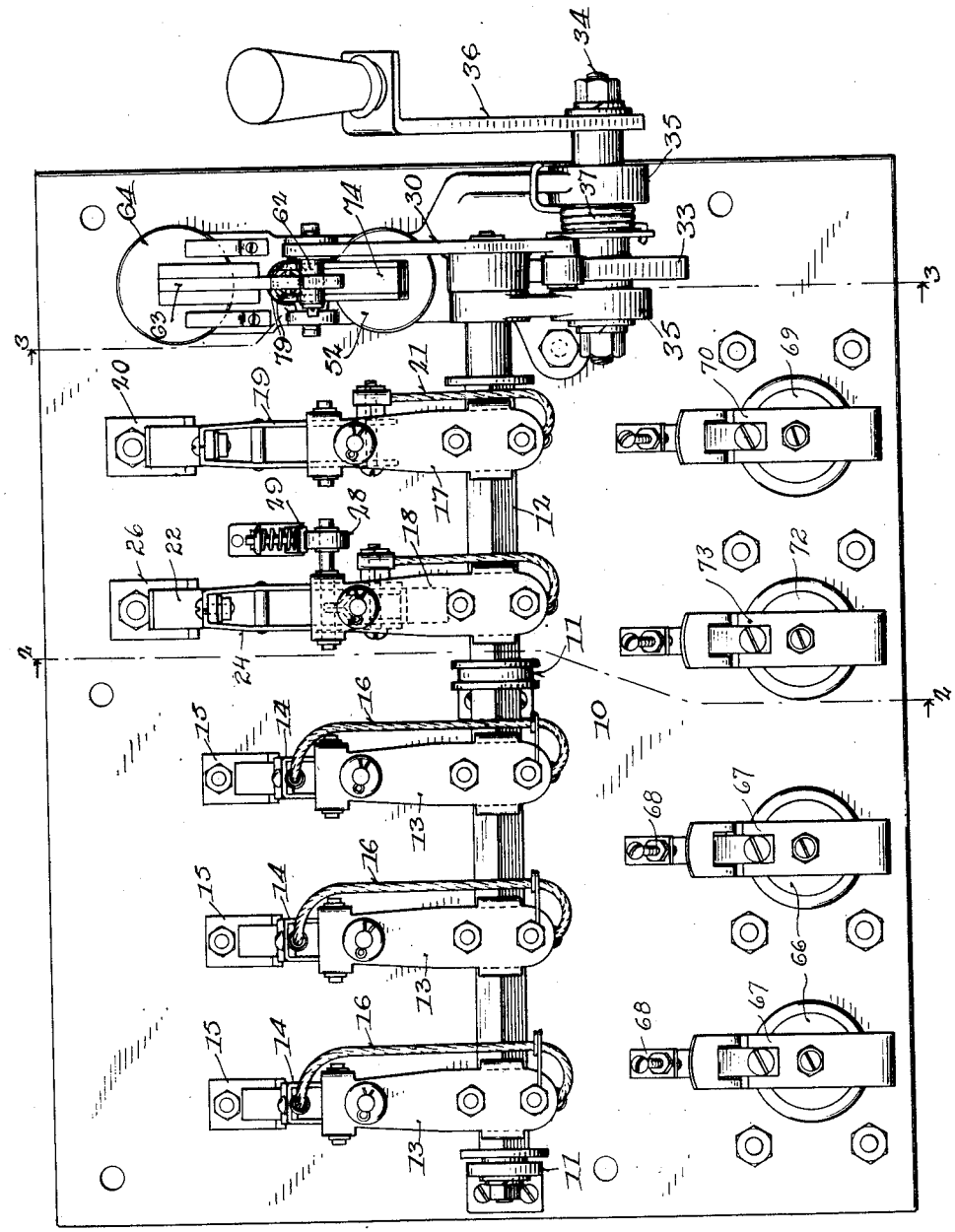
Figure 1 is an elevational view of the switch mechanisms of my improved apparatus for controlling the operation of a battery-charging motor-generator set.

Taking up now the general operation of the apparatus described, and carrying out my improved method of starting the operation of the motor-generator set, the shaft 12 is rocked by engagement of the first shoulder 38 of the cam-plate with the crank portion of the shaft to engage the contacts 19 and 22 with the stationary contacts 20 and 26 respectively (see Figs. 1 and 2). This closes a circuit through the armature circuit and the battery, and a shunt-circuit exists through the field 45 and through the entire resistance of the rheostat 56. The generator is thus caused to act as a motor and thus drives the prime alternating-current motor 42. The resistance 48 included in the direct-current circuit prevents an excessive draft of current therein.

The second step of operation consists of engaging the contacts 23 and 27, thus eliminating the resistance 48 and permitting the generator, acting as a motor, to attain substantially full speed and impart corresponding speed to the alternating-current motor. The lock-out magnet 52, whose operation will be later described, is active until this full speed is attained, and prevents premature movement of the switch mechanism to the third step.

In the third step, the alternating-current contacts 14 and 15 are engaged, thus closing the circuit through the alternating-current motor, which, running at substantially its normal speed will take up the load at a normal draught of current from the supply lines. Immediately subsequent to this closing action, the contacts 28 and 29 will be engaged, which will result in increasing the current through the shunt field of the generator, thus restoring the generator to its normal current conditions for charging the battery, the shunt circuit thus passing from the main line to the field 45, from thence through the wire 57 to the rheostat 56 and through the selected portion thereof to the contact arm 59 and through said arm 59, line 60 and contacts 29 and 28 back to the main line. The rheostat 56 is adjustably set to procure the desired rate of current for charging the storage-battery, and this setting need not be disturbed in carrying out my method of starting operation of the charging motor and generator.

When the starting operation has been completed, the shaft 12 is held in a position closing all of the circuits, by means of an arm 61 extending upwardly from the crank-head 30 and carrying a laterally disposed roller 62 engageable with the hook-end portion of a pivoted armature 63, said armature co-operating with a magnet 64 included in a shunt circuit 65 extending across the alternating-current lines, said magnet being thus energized upon closing the alternating-current lines whereby the armature 63 will be held with its hook portion engaging the roller 62 of the crank-arm to prevent releasing movement of the shaft. A series of magnetic switches are included in this shunt circuit whereby a single release mechanism is afforded for the plurality of circuits, which is independently influenced by the load conditions of each of said circuits, and which will consequently clear the entire apparatus to open position upon the occurrence of any one of a plurality of conditions adverse to desired operation. Thus, a pair of electro-magnets 66 are included in the alternating-current lines 41 and each co-operates with an armature switch-arm 67 interposed in the shunt circuit 65 and engaging a stationary contact 68 in said circuit under the influence of gravity, an overloading of the alternating-current circuit energizing one or both of said magnets to open the switch. A similar magnet 69 is interposed in the main direct-current line 49 and co-operates with a similar armature switch-member 70 in the shunt line 65. A wire 71 extends from the ampere hour meter 54 to an electro-magnet 72 which is branched into the field shunt line 60 and this magnet 72 controls a switch 73 in the line 65 whereby, upon the charging of the batteries with a desired amount of current the magnet 72 will become energized sufficiently to open the switch-arm 73 and release the entire main switch mechanism.

Taking up now the operation of the lock-out magnet 52 for preventing the closing of the alternating-current contacts until a desired speed of the alternating-current motor has been attained, and the current of the direct-current circuit correspondingly reduced to de-energize said magnet, an armature 74 is provided for said magnet having a pair of arms at one end embracing the hook portion of the armature 63 and mounted on the pivot-shaft 75 of said latter armature and connected by a yoke 76 with one end of a contractile spring 77 which extends through the panel 10 and is secured to an adjustable screw 78. The armature 74 is thus urged away from the lock-out magnet and the said arms of the armature carry abutment lugs 79 which are disposed out of the path of the roller 62 in this position of the armature. When the lock-out magnet is energized sufficiently however to attract the armature 74, the abutment-lugs 79 will be disposed in the path of the roller and will thus prevent completion of the third step of the starting operation, to close the alternating-current lines, this lock-out being effective until a desired speed of the rotors has been built up, as explained.

Summarizing now the entire foregoing description, it is seen that I have provided a highly efficient, compact and readily operated controlling mechanism for storage-battery charging sets, whereby my improved method of starting operation of such sets may be most expeditiously carried out, although it will be appreciated other mechanism may be employed for carrying out my method, and that various co-operative features of the apparatus disclosed may be used either in conjunction with my method or independently thereof. Thus, while I have shown and described the preferred embodiment of my invention, it will be appreciated that various changes and modications of structure and of operation may be employed within the scope of the appended claims without departing in any manner from the spirit of my invention.

What is claimed is:—

1. The combination of a motor, a generator, a storage-battery and a source of power, a circuit including said motor and source of power, a circuit including said generator and storage battery, switch members in said circuits, a single means for holding said switch members in circuit-closing position, and means automatically operable by adverse current conditions in either circuit for actuating said holding means to release all of said switch members.

2. The combination of a motor, a generator, a storage-battery and a source of power, a main circuit including said motor and source of power, a main circuit including said generator and storage-battery, switch members in said circuits, a magnet, a circuit energized upon closing one of said main circuits and including said magnet, switch holding means controlled by said magnet, release switches in said magnet circuit, and magnets in said main circuits for actuating said release switches.

3. The combination of a primary motor, a generator, a storage-battery and a source of power, a circuit including said motor and source of power, a circuit including said generator and storage-battery, switch members in said circuits, a magnet energized upon closing the primary motor circuit, a single means controlled by said magnet for holding all of the switch members in closed position, and means operable by adverse current conditions in either circuit to deenergize said magnet to release said holding means and all of said switch members.

4. The combination of a motor, a generator, a storage-battery and a source of power, a main circuit including said motor and source of power, a main circuit including said generator and storage-battery, switch members in said circuits, a magnet, a circuit energized upon closing one of said main circuits and including said magnet, a single switch holding means for all of the switch members and controlled by said magnet, a release switch in said magnet circuit, means operable by ampere hour measure of current flowing through the generator circuit for actuating said release switch, another releasing switch in the magnet circuit, and means operable by adverse conditions in the motor circuit to actuate the last mentioned release swtich.

5. An electrical controlling device including a motor, a generator, a source of power, a storage-battery, a circuit including said source of power and the motor, a circuit including the generator and storage-battery, switches in said circuits, means operable by a single movable member for first closing the switch of the generator circuit and then closing the switch of the motor-circuit, means operable by excess current conditions in the generator circuit for preventing movement of said movable member to a position closing the switch of the motor circuit, and means for holding said movable member in circuit-closing position.

6. An electrical controlling device including a rock-shaft, a connected motor and generator, a source of power, a circuit including said source of power and the motor, a contact in said circuit, a rotatably mounted rock shaft, a switch-arm in the circuit mounted on the rock-shaft, a circuit including the generator and battery, a contact in the generator circuit, a switch-arm in the circuit mounted on said rock-shaft and engageable with the generator-circuit contact prior to engagement of the first mentioned switch-arm and contact upon rocking movement of the shaft, a shunt-circuit for said generator, a resistance in said shunt-circuit, and a contact connected with the shunt-circuit to short-circuit said resistance, said last named contact being engageable by a portion of the generator switch-arm subsequent to engagement of said arm with its co-operating main contact.

In testimony that I claim the foregoing I have hereunto set my hand at Milwaukee, in the county of Milwaukee and State of Wisconsin.

GUSTAV O. WILMS.